(12) United States Patent
Dichtl et al.

(10) Patent No.: US 8,410,857 B2
(45) Date of Patent: Apr. 2, 2013

(54) APPARATUS AND METHOD FOR GENERATING A RANDOM BIT SEQUENCE

(75) Inventors: Markus Dichtl, München (DE); Bernd Meyer, München (DE)

(73) Assignee: Siemens Aktiengesellschaft, Munich (DE)

(*) Notice: Subject to any disclaimer, the term of this patent is extended or adjusted under 35 U.S.C. 154(b) by 24 days.

(21) Appl. No.: 13/119,765

(22) PCT Filed: Jul. 30, 2009

(86) PCT No.: PCT/EP2009/059837
§ 371 (c)(1),
(2), (4) Date: Mar. 18, 2011

(87) PCT Pub. No.: WO2010/031630
PCT Pub. Date: Mar. 25, 2010

(65) Prior Publication Data
US 2011/0163818 A1   Jul. 7, 2011

(30) Foreign Application Priority Data
Sep. 22, 2008 (DE) .......................... 10 2008 048 292

(51) Int. Cl.
*H03K 3/03* (2006.01)
*H03B 29/00* (2006.01)
*G06F 7/58* (2006.01)

(52) U.S. Cl. .............................. 331/57; 331/78; 708/251

(58) Field of Classification Search ..................... 331/57, 331/78; 380/46, 47; 708/250–256; 714/728, 714/739
See application file for complete search history.

(56) References Cited

U.S. PATENT DOCUMENTS

| | | | |
|---|---|---|---|
| 3,681,708 A * | 8/1972 | Olmstead | 331/78 |
| 6,065,029 A * | 5/2000 | Weiss | 708/251 |
| 6,240,432 B1 | 5/2001 | Chuang et al. | 708/252 |
| 6,480,072 B1 * | 11/2002 | Walsh et al. | 331/78 |

(Continued)

FOREIGN PATENT DOCUMENTS

| | | |
|---|---|---|
| DE | 102006032419 B3 | 3/2007 |
| JP | 10051276 A | 2/1998 |

OTHER PUBLICATIONS

German Office Action, German application No. 10 2008 048 292.7-53, 5 pages, May 15, 2009.
Sasaki, N., "Higher Harmonic Generation in CMOS/SOS Ring Oscillators", IEEE Transactions on Electron Devices, vol. ed. 29, No. 2, pp. 280-283, Feb. 1982.

(Continued)

*Primary Examiner* — Levi Gannon
(74) *Attorney, Agent, or Firm* — King & Spalding L.L.P.

(57) ABSTRACT

An apparatus for generating a random bit sequence has a ring oscillator which includes inverting digital devices and on which an oscillator signal can be tapped. An intermediate storage element monitors and stores fluctuating levels of the oscillator signal. At least two controllable switch devices for simultaneously exciting at least two harmonic wave edges of the ring oscillator are provided in a signal path of the ring oscillator. The phasing of the two harmonic wave edges and a potential convergence thereof are subject to statistical fluctuations, which are used as a basis for the random bit generation. A corresponding random number generator can be used in particular as an FPGA for security applications, such as cryptographic methods. The apparatus has substantially digital components, which are easy to produce in a standardized manner. A dedicated regulating circuit is not necessary. The apparatus is also robust toward exterior influences.

20 Claims, 6 Drawing Sheets

U.S. PATENT DOCUMENTS

| | | | |
|---|---|---|---|
| 7,279,996 B2 * | 10/2007 | Boerstler et al. | 331/57 |
| 7,797,361 B2 * | 9/2010 | Lazich et al. | 708/251 |
| 2004/0213407 A1 | 10/2004 | Fujita et al. | 380/46 |
| 2004/0264233 A1 | 12/2004 | Fukushima et al. | 365/145 |
| 2008/0016135 A1 | 1/2008 | Janke et al. | 708/251 |
| 2008/0258825 A1 * | 10/2008 | Gressel et al. | 331/78 |
| 2009/0106339 A1 * | 4/2009 | Vasyltsov et al. | 708/251 |
| 2009/0177725 A1 * | 7/2009 | Ikegami et al. | 708/251 |

OTHER PUBLICATIONS

International PCT Search Report and Written Opinion, PCT/EP2009/059837, 17 pages, Dec. 22, 2009.

* cited by examiner

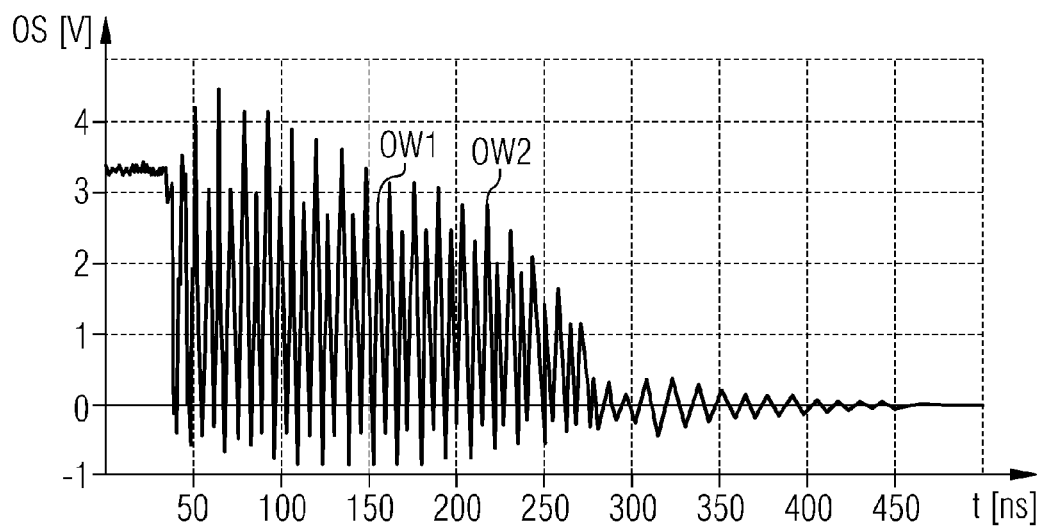
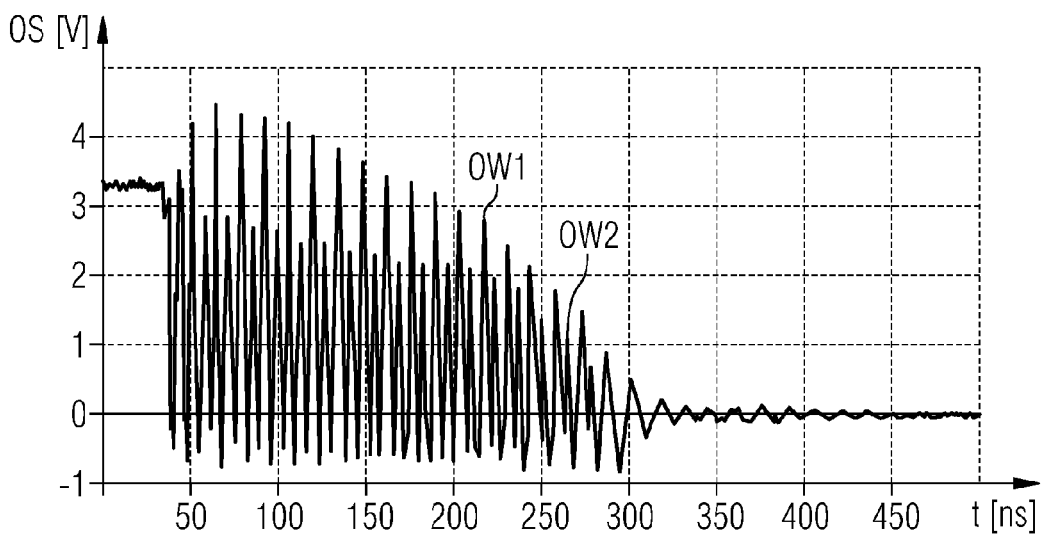

APPARATUS AND METHOD FOR GENERATING A RANDOM BIT SEQUENCE

CROSS-REFERENCE TO RELATED APPLICATIONS

This application is a U.S. National Stage Application of International Application No. PCT/EP2009/059837 filed Jul. 30, 2009, which designates the United States of America, and claims priority to DE Application No. 10 2008 048 292.7 filed Sep. 22, 2008. The contents of which are hereby incorporated by reference in their entirety.

TECHNICAL FIELD

The present invention relates to apparatuses and methods for generating random bits and random bit sequences. That serves to implement a random-number generator, for example.

BACKGROUND

Random numbers, occurring in digital form as random bit sequences, are often required in applications relevant to security. For example random numbers have to be generated and used in connection with asymmetric authenticating methods. Especially in the case of RFID tags having a security functionality it is necessary to generate corresponding random numbers with particularly few hardware resources. What is desirable therein is to employ only digital logic circuits that can be favorably implemented in terms of cost and effort.

Random-number generators were employed in the past with use being made of, for example, analog noise sources whose signals were digitized. However, hybrid analog/digital circuits are always costly to implement.

In order to generate real random bit sequences a physical random source that is generally difficult to use in computer systems is, as a rule, necessary. In the case of hardware random-number generators a physical process is used as the random source. Sensors then have to be used, though, to register and take measurements from the physical system, with the random data able then to be extracted from the measured data. What can be cited as instances of randomly determined physical processes are radioactive decay, noise in semiconductors, free-running oscillators, and quantum statuses of photons. Although good randomizing of random data can be achieved thereby, the requisite measuring equipment is exceptionally costly so that an application in mass articles, for example for simple encrypting of data on RFID tags, is uneconomical. Moreover, a frequent problem in the case of purely electrically operated random-number generators is that the correct operating mode depends on the need for analog electronic circuits to be set precisely to predefined work points. Thus problems will arise in the event of manufacturing dispersions and changes to the operating conditions such as temperature and other external influences. It is therefore disadvantageous because purely analog circuits are sensitive to interference and manipulation.

What are termed pseudo-random numbers can be generated algorithmically. Although not actually random, the algorithmically generated random bits or random numbers ought therein to be as far as possible indistinguishable from real random bits. In the case of pseudo-random bits a microprocessor device CPU (=Central Processing Unit) is operated by means of a corresponding program that requires what is termed a seed value from a memory. From the seed's current value the CPU computes random bits and new values of the seed, which are in turn stored and overwrite the old value. In order not to obtain the same random-bit or number sequences on different devices, the various devices are in a personalizing step set to an individual start value.

Although they do indeed supply sufficiently random data for many applications, pseudo-random numbers cannot completely replace physical random numbers. That is because genuine randomness is needed at least for determining an initial seed value. The pseudo-random numbers are, though, deterministic proceeding from the initial seed value. The statistical quality of generated pseudo-random data is therein highly dependent on the algorithm employed and the length of the seed value. For example methods employing Fibonacci generators are used in C standard libraries. Feedback shift registers are also sometimes used for generating pseudo-random numbers. The aforementioned measures are unsuitable for cryptographic applications. An attacker could too easily predict the random number sequence.

More complex methods employ cryptographically powerful hash functions or encryption techniques to compute random data and new seed values from a current seed value. CPUs requiring particularly efficient resources are therefore necessary for achieving adequate quality in generating random numbers.

In the past it was also proposed that purely digital random-number generators having digital electric components in integrated circuits be provided. For example it was proposed using the jitter in ring oscillators for random-number generation. Digital ring oscillators are embodied usually from an odd number of inverters that are arranged cyclically or, as the case may be, provide mutual feedback. The fluctuations in the period lengths are therein referred to as jitter. The jitter is, though, as a rule small compared with the period length so that its randomness accumulates only slowly over time. To generate random numbers more quickly, Fibonacci or Gallois ring-oscillator variants have been proposed by means of which random-number sequences can be generated faster.

While it is true that the digitally implemented random-number generators can be favorably produced, for example as FPGAs or in ASICs (Application-Specific Integrated Circuits), production variations in the relevant components disrupt the process of random-number generation. Algorithmic post-processing is also employed to compensate statistical defects in the random data due to, for instance, physical noise sources. The measurement data is therein compressed to achieve an increase in entropy. Cryptographically powerful hash functions can also be used to balance out fluctuations in frequency distribution.

Overall, the known methods and generators for random-bit generation or, as the case may be, the corresponding hardware implementations are associated with a number of disadvantages that as a rule preclude their use in mass products.

SUMMARY

According to various embodiments, an improved apparatus and a method for generating random bits can be provided.

According to an embodiment, an apparatus for generating a random bit sequence may have a ring oscillator that includes a plurality of inverting digital devices and on which an oscillator signal can be tapped, a buffer element for storing levels of the oscillator signal, and having at least two controllable switching devices provided in a signal path of the ring oscillator for simultaneously exciting at least two harmonic wave edges of the ring oscillator.

According to a further embodiment, the ring oscillator may include as inverting digital devices an even number of serially connected inverters. According to a further embodiment, the controllable switching devices can be embodied as logical gates, in particular AND gates or OR gates. According to a further embodiment, the buffer element may register and store a number of rising and/or falling oscillator-signal edges. According to a further embodiment, a control device may generate a start signal for the controllable switching devices and buffer element in such a way that every controllable switching device will in each case generate a harmonic wave edge of the oscillator signal and the buffer element will be reset. According to a further embodiment, the control device may tap a logical level of a random bit at an output of the buffer element, generating the start signal for generating a plurality of random bits, and feeding out the plurality of random bits as a random bit sequence. According to a further embodiment, in each case an equal number of inverting digital devices may be provided between the controllable switching devices. According to a further embodiment, the controllable switching devices in a first switching state may block oscillating of the ring oscillator and in a second switching state may open a signal path that includes the inverting digital devices. According to a further embodiment, the inverting digital devices and controllable switching devices may be integrated as at least two cyclically connected logical gates. According to a further embodiment, a delay device may be connected between an input of a logical gate and an output of the respectively other logical gate. According to a further embodiment, another buffer element can be coupled to the ring oscillator in such a way that parasitic influences of the buffer elements will be symmetric with respect to the inverting digital devices. According to a further embodiment, the buffer element can be embodied as a flip-flop. According to a further embodiment, the apparatus can be embodied as an FPGA.

According to another embodiment, a method for generating a random bit sequence may comprise the steps: —Providing a ring oscillator that includes digital switch elements; —exciting at least two harmonic wave edges of the ring oscillator as an oscillator signal that fluctuates between two predefined logical levels; —tapping the oscillator signal; and —determining a random bits as a function of a number of level crossings of the oscillator signal within a predefined period of time.

According to a further embodiment of the method, the predefined period of time can be selected such that the harmonic wave edges will converge within the predefined period of time and cause the ring oscillator to oscillate in a stable manner. According to a further embodiment of the method, the random bit can be determined by counting the rising and/or falling oscillator-signal edges within the predefined period of time, with in particular a number of signal edges undergoing a modulo operation. According to a further embodiment of the method, a plurality of random bits that supply a random bit sequence or binary random number can be successively determined.

BRIEF DESCRIPTION OF THE DRAWINGS

The invention is explained in more detail below with the aid of exemplary embodiments with reference to the following figures:

FIGS. 2-5: show possible forms of oscillator signals and random bit signals;

Unless indicated otherwise, elements that are identical or have identical functions have been assigned the same reference numerals/letters in the figures.

DETAILED DESCRIPTION

Figure 1:
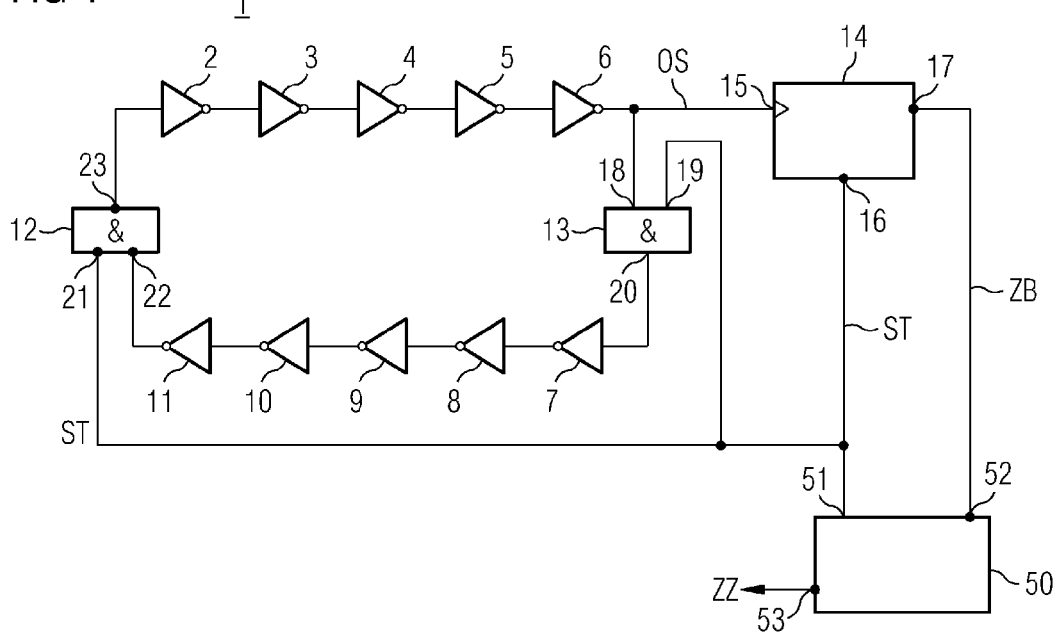
FIG. 1: is a circuit diagram of a first embodiment variant of an apparatus for generating random bit sequences.

An apparatus for generating a random bit sequence accordingly has a ring oscillator that includes a plurality of inverting digital devices and on which an oscillator signal can be tapped. A buffer element for storing levels of the oscillator signal is provided, and at least two controllable switching devices are provided in a signal path of the ring oscillator for preferably simultaneously exciting at least two harmonic waves or, as the case may be, edges of a harmonic wave of the ring oscillator.

The buffer element monitors and stores the fluctuating levels of the oscillator signal. The simultaneously generated harmonic wave edges being phase-shifted relative to each other, they potentially converge subject to statistical fluctuations. The resulting signal forms cannot be predicted and serve as the basis for random bit generation.

The following steps are provided in a method for generating a random bit sequence:

Providing a ring oscillator that includes digital switch elements;

exciting at least two edges of one or more harmonic wave(s) of the ring oscillator as an oscillator signal that fluctuates between two predefined logical levels;

tapping the oscillator signal; and determining a random bit as a function of a number of level crossings of the oscillator signal within a predefined period of time.

For example proceeding from a static state having suitably selected starting conditions that can be established by the controllable switching devices, a metastable oscillation state of the ring oscillator can be set in the form of a harmonic wave. The phasing of the two edges of the harmonic wave is subject to statistical fluctuations. As a rule the two edges of the harmonic wave will converge after a certain period of time. If the ring oscillator has an even number of inverters it will come to a standstill. If an odd number of inverters is provided, the ring oscillator will drop to its basic frequency and continue oscillating in a stable manner.

As a random bit it is possible to use, for example, a number of rising or falling oscillator-signal edges within the predefined period of time. In particular the buffer element, which can be embodied for example as a flip-flop, is suitable for counting signal edges. If said determined or stored number furthermore undergoes a modulo operation, the result will be a random bit.

For example a control device can successively determine a plurality of random bits on the buffer element which then supply a random bit sequence or binary random number.

The controllable switching devices can be embodied in the apparatus as AND gates, for instance. AND gates are easy to implement in a standardized manner and serve, depending on an input signal's logical level, as a closed switch or block the signal path inside the ring oscillator.

The controllable switching device can be embodied analogously as an OR gate, with a logical L level then causing the circuit to start oscillating.

Further provided as an embodiment variant is a control device that generates a start signal for the controllable switching devices and buffer element in such a way that every controllable switching device will in each case generate a harmonic wave edge of the oscillator signal and the buffer element will be reset. That enables a metastable oscillation state to be achieved starting from a static state.

The control device can furthermore tap a logical level of a random bit at an output of the buffer element, with the start signal for generating a plurality of random bits being generated, and the plurality of random bits being fed out from the control device as a random bit sequence. That manner of proceeding has the advantage, for example, that no further control circuit will be necessary for arriving at or sustaining a metastable state of the ring oscillator. Rather it is the case that said metastable state, serving as a basis for random bit generation, will result from generating harmonic waves.

In an embodiment variant in each case an equal number of inverting digital devices is provided between the controllable switching devices. That symmetric arrangement has the advantage that any interference will be rendered symmetric and the statistical randomness will be improved.

In yet further embodiment variants of the apparatus for generating a random bit sequence another buffer element is coupled to the ring oscillator in such a way that parasitic electric influences from the buffer elements will be symmetric with respect to the inverting digital devices. The capacitive load of the inverting devices or switching devices embodied as, for example, logical gates will hence be largely symmetric so that the respective harmonic wave will be sustained for a particularly long period of time and the statistically random phase relationship between the two harmonic waves will be more favorable. The second buffer element embodied as, for example, a flip-flop serves only, for instance, to render the circuit's oscillator part symmetric, with its output not being used.

The inverting digital devices and the controllable switching devices can be integrated as two logical gates such as, for instance, NAND gates. A NAND gate combines on the one hand an inverting function of the transiting signal and, on the other, a switching function, depending on how the logical input signals are combined. The apparatus for generating random bits can therefore be embodied as being especially compact.

Instead of the NAND gates it is possible also to use NOR gates, with the transition to the logical value H then starting the circuit's oscillation.

It is further conceivable for a delay device to be connected between an input of a logical gate, in particular a NAND gate (or, as the case may be, the NOR gate) and an output of the respectively other NAND gates (or, as the case may be, NOR gate). The delay time through the delay device, for example a chain of driver circuits, should therein be longer than the switching time of the NAND gates (or, as the case may be, NOR gates). The two harmonic waves would otherwise occur virtually directly one upon the other.

The apparatus is in a development embodied as an FPGA (=Field-Programmable Gate Array). A corresponding programming operation will be particularly easy owing to the fully digitally implemented apparatus. The apparatus and method for implementing are furthermore suitable for implementing in an ASIC.

The proposed apparatus and the method have the advantage of being particularly easy to implement in circuitry terms. Only few electronic digital components are required. Corresponding random-number generators can thus be used particularly suitably for bulk-business applications.

FIG. 1 shows a random-bit generator as an apparatus for generating random bit sequences. Random-bit generator 1 includes a ring oscillator constructed from serially connected inverters 2-11. What is shown is an upper branch comprising five inverters 2-6 and a lower branch comprising five inverters 7-11. The two branches are connected to each other cyclically, with in each case an AND gate 12, 13 being used as a controllable switching device. The AND gates each have two inputs 18, 19, 21, 22 and an output 20, 23.

In each case one input 21, 19 of AND gates 12, 13 is coupled via a suitable lead to a control device 50 that generates a control signal ST. The ring oscillator's signal path thus includes inverters 2-11 and the two AND gates 12, 13. A corresponding oscillator signal OS can be tapped on the signal path.

A buffer element 14 embodied as a flip-flop is coupled for registering and storing the oscillator signal OS. Flip-flop 14 has a clock input 15, a resetting input 16, and a data output 17. Resetting input 16 is coupled to control output 51 of control device 50 and, like inputs 21 and 19 of AND gates 12, 13, receives the start signal ST. The oscillator signal OS is routed to clock input 15 of flip-flop 14. A random bit ZB, which is routed to an input 52 of control device 50, can be tapped at data output 17 of flip-flop 14.

Control device 50 generates the start signal ST in such a way that, proceeding from AND gates 12, 13, in each case one edge of a harmonic wave is produced in the signal path. A first harmonic wave edge therein passes from output 23 of AND gate 12 through inverters 2-6, and a second harmonic wave passes from output 20 of second AND gate 13 through inverters 7-11. The start signal ST can initially be set for example to logical L level or 0 level. There will then always be a logical L level or, as the case may be, a 0 at output 23, 20 of AND gates 12, 13. The ring oscillator will hence not oscillate. If the start signal ST is set to logical H level or 1, AND gates 12, 13 will operate as closed switches. That means to say that input 22 is logically linked to output 23 of AND gate 12 and input 18 is logically linked to output 20 of AND gate 13. Flip-flop 14 is simultaneously reset.

There are now two harmonic wave edges in the ring oscillator's signal path. At the start there is a logical 1 at the input of first inverter 2. Inverting of follow-up inverters 3-6 then produces a logical 0 at input 18 of AND gate 13. A harmonic wave edge, proceeding from a logical 1, at output 20 of AND gate 13 or, as the case may be, the input of inverter 7 is simultaneously driven by the lower inverter chain. That results in a logical 0 at the output of inverter 11. The two harmonic wave edges are hence present in phase-shifted form.

The oscillator signal therefore includes mutually superimposed edges of a harmonic-wave signal.

Superimposing of the harmonic wave's two edges means that the oscillator signal OS does not produce a stable logical signal. There is therefore an irregular oscillating logical signal fluctuating at clock input 15 of flip-flop 14. The oscillator signal can in that metastable oscillation state be interpreted as an analog signal having random properties.

A topologically and functionally equivalent arrangement can be achieved also by replacing two inverters with NAND gates in a ring oscillator constructed from inverters. Said gates should be provided preferably at opposite locations on the ring to achieve signal properties that are symmetric toward interferences. In order to generate more than two harmonic waves it is conceivable also to provide a plurality of controllable switches that generate harmonic wave edges by suitably supplying a start signal.

For explaining the functioning mode of the embodiment variant of a random-number generator shown in FIG. 1 in greater detail, signal forms of the oscillator signal OS and random bit signal ZB are plotted over time t in FIGS. 2-5. In FIG. 2, for example, the oscillator signal at clock input 15 of flip-flop 14 is plotted over time. Logical L level corresponds in the following representations of signal curves to a level of 0 V and an H level hence to a logical 1, about 3.3 V.

It can be seen that the oscillator signal will begin to oscillate irregularly at the output of inverter 6 as soon as the start signal ST is set to logical 1. It is apparent that two harmonic wave edges OW1 and OW2 are shifted with respect to each other and have different amplitudes over their time curve. The harmonic wave's two edges OW1 and OW2 have converged starting at about 300 ns and fade out in a stable manner. The ring oscillator thus comes to a standstill.

A ring oscillator with an even number of inverters as shown in FIG. 1 basically has a fixed point and comes to a standstill after a certain period of time. The signal curve up to when the ring oscillator comes to a standstill serves as a random basis for generating the random bit. That is because flip-flop 14 as a clock divider counts the number of modulo 2 oscillations. That means the level at data output 17 corresponds coincidentally to the number of rising or falling signal edges occurring in the signal curve shown in FIG. 2. Another random element is due to the greatly fluctuating amplitudes so that in the range between 200 and 300 ns, for example, there is no well-defined logical level at input 15 of the buffer or, as the case may be, of flip-flop 14.

FIG. 3 shows once more the oscillator-signal curve over time. The curve shown in FIG. 3 corresponds to a start differing from that shown in FIG. 2. It can be seen that there are again two harmonic wave edges OW1, OW2 that approach each other and after about 300 ns take the oscillator to a stable state. The signal curves shown in FIG. 2 and in FIG. 3 are, however, randomly mutually different.

Figure 4:
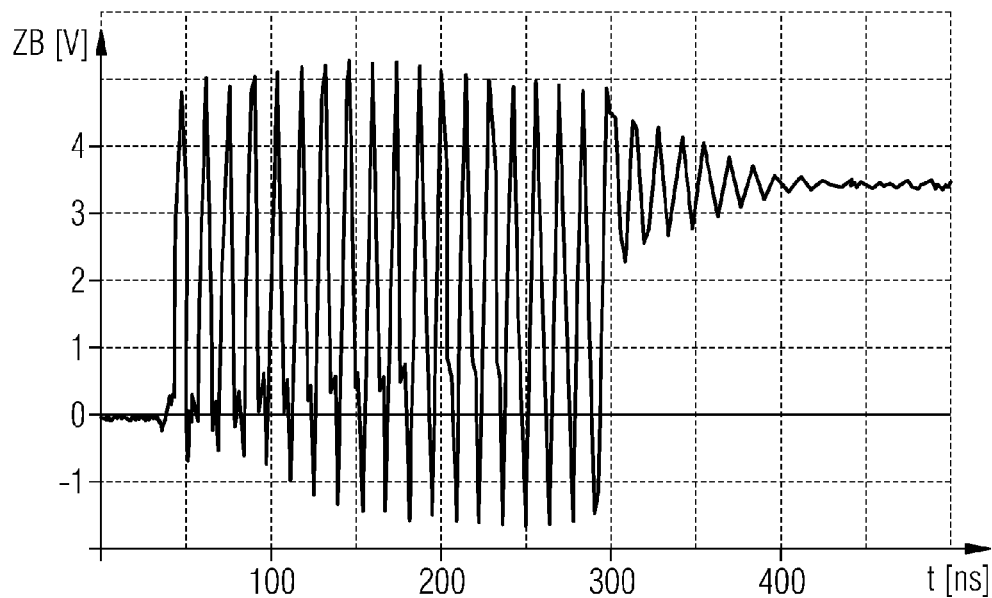
Figure 5:
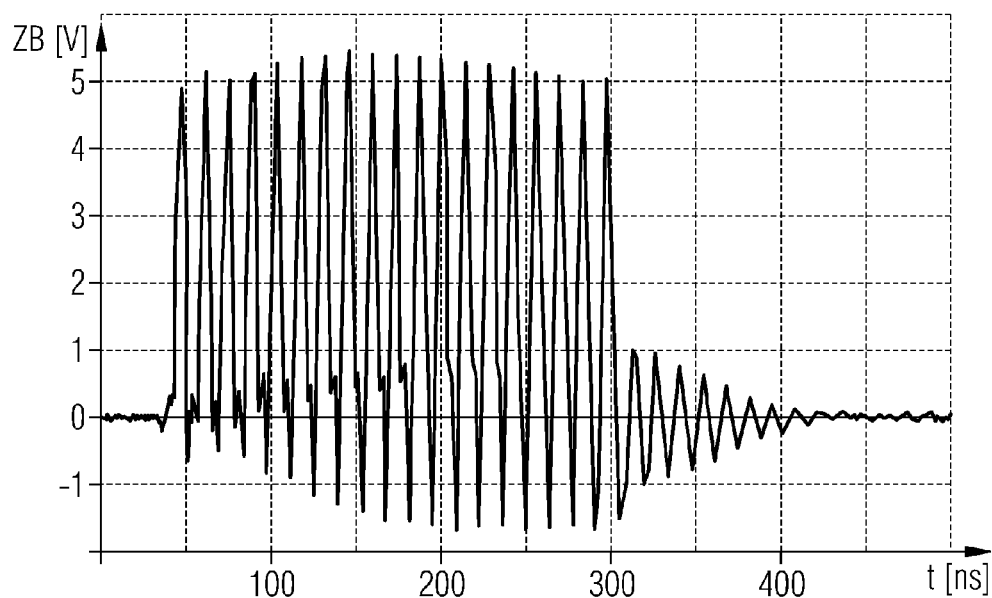

FIGS. 4 and 5 show the time curve of the random bit signal ZB at output 17 of flip-flop 14. Both logical H and logical L levels occur at output 17 of flip-flop 14 owing to the random oscillator-signal form at clock input 15 of flip-flop 14. The signal form shown in FIG. 4 for the random bit ZB occurs as a random function of the oscillator signal OS at clock input 15.

A random bit which in the case of FIG. 4 has a logical H level can be registered after a predefined period of time, for example 400 ns, when the ring oscillator has attained its stable state. That is done by, for example, control device 15 which is coupled via its input 52 to output 17 of flip-flop 14.

FIG. 5 shows a similar signal curve. After 400 ns the logical level of the resulting random bit is, however, a logical L level measuring approximately 0 V. A period of time can now be specified, for example, during which as a rule the ring oscillator will attain a stable state after two harmonic wave edges have been generated by the start signal. The signal curves or, as the case may be, signal edges meanwhile occurring randomly serve to determine a random bit. The quality of the randomness of the generated random bit ZB depends substantially on the non-determinable, delayed curve of the generated harmonic wave. The two harmonic wave edges pass through the ring-oscillator arrangement with a phase shift. A role is therein played both by the switching characteristics, in particular switching times, of the two AND gates 12, 13 and by the delay characteristics of inverters 2-11.

Figure 6:
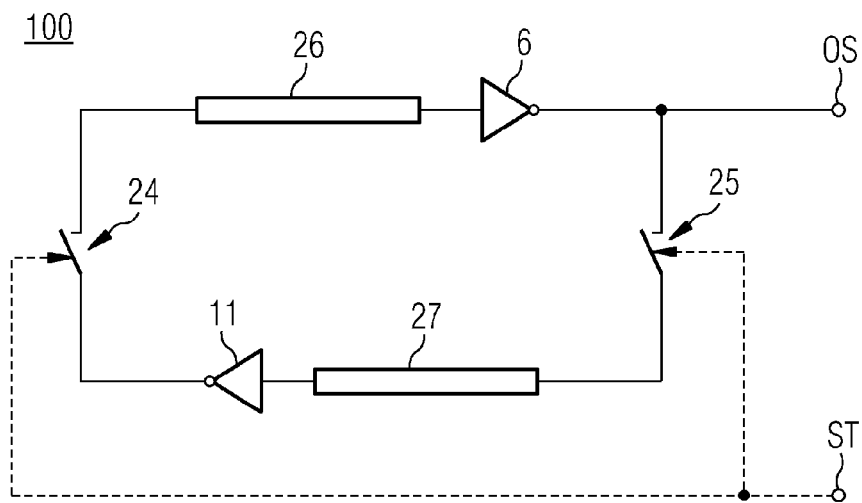
FIG. 6: is an equivalent circuit diagram of a ring oscillator that can be employed in embodiment variants of apparatuses for generating random bits.

An equivalent circuit diagram for a corresponding ring oscillator is therefore produced in FIG. 6. In a simple embodiment variant of a ring oscillator 100 suitable for use in a random-bit generator in each case an inverter 6, 11 and a delay path 26, 27 are connected one behind the other. Said two delay and inverter paths are switched cyclically by two switches 24, 25. Both switches can be opened or closed by means of a start signal ST. That takes place substantially simultaneously.

There is no oscillating of any kind if both controllable switches 24, 25 are open. Rather it is the case that stable logical levels will be present at the input and output of a respective inverter 6, 11. If, though the switches are closed, for example a signal edge—proceeding from the output of inverter 6 (a well-defined H or L level)—will pass through the delay path 27 and be inverted by second inverter 11. The thus inverted harmonic-wave signal will then again pass through a delay path 26 and again be inverted by inverter 6. Two harmonic wave edges thus circulate in the signal path as the oscillator signal OS. The switching times of controllable switches 24, 25 are therein preferably shorter than the signal delay through delay paths 26, 27.

As was explained in connection with FIG. 1, for example, a random bit is then determined by tapping the oscillator signal OS and counting the signal edges resulting from the two superimposed harmonic wave edges. A random bit sequence is then generated by repeatedly triggering the harmonic waves and resetting the corresponding buffer element, such as a flip-flop.

Figure 7:
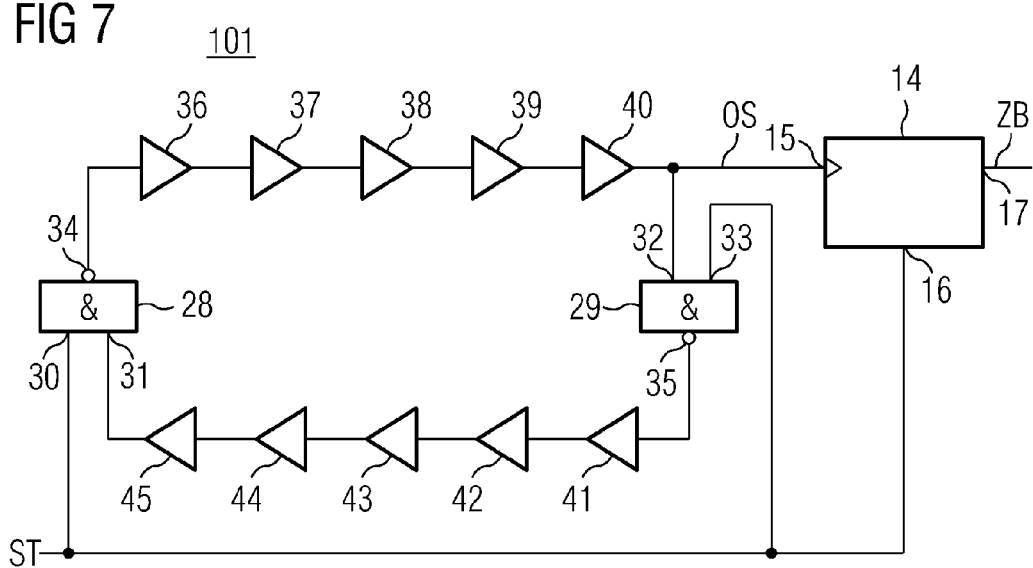
FIG. 7: is a circuit diagram of a second embodiment variant of an apparatus for generating random bit sequences.

FIG. 7 shows a random-bit generator as an apparatus for generating random bits in which inverting elements are integrated in NAND gates. Random-bit generator 101 has a chain of driver circuits 36-40 principally constituting a delay path. A second corresponding delay path is constructed from five further drivers 41-45. The result is an upper branch and a lower branch mutually linked via a NAND gate 28 or, as the case may be, 29. NAND gates 28, 29 each have two signal inputs 30-33 and an inverting output 34, 35. Compared with FIG. 6, NAND gates 28, 29 correspond to a combination of controllable switches 24, 25 with in each case one inverter 6, 11.

A start signal ST is routed to first inputs 30, 33 of NAND gates 28, 29. The upper delay path comprising drivers 36-40 is connected between output 34 of first NAND gate 28 and second input 32 of second NAND gate 29. The lower branch comprising the five drivers 41-45 is coupled between output 35 of second NAND gate 29 and second input 31 of first NAND gate 28. The oscillator signal OS is tapped at the output of driver 40 and routed to a clock input 15 of a flip-flop 14. A resetting input 16 of flip-flop 14 is likewise connected to the start signal ST, and the flip-flop's data output 17 supplies a random bit ZB. The functioning mode is similar as regards the circuit described in FIG. 1. As soon as the start signal is set to 1, flip-flop 14 will be reset and mutually phase-shifted harmonic wave edges of the resulting ring oscillator having NAND gates 28, 29 and driver circuits 36-45 in the signal path will start at output 34 or, as the case may be, 35 of the NAND gates. Even with these few digital elements it is possible to generate high-quality random bits.

Figure 8:
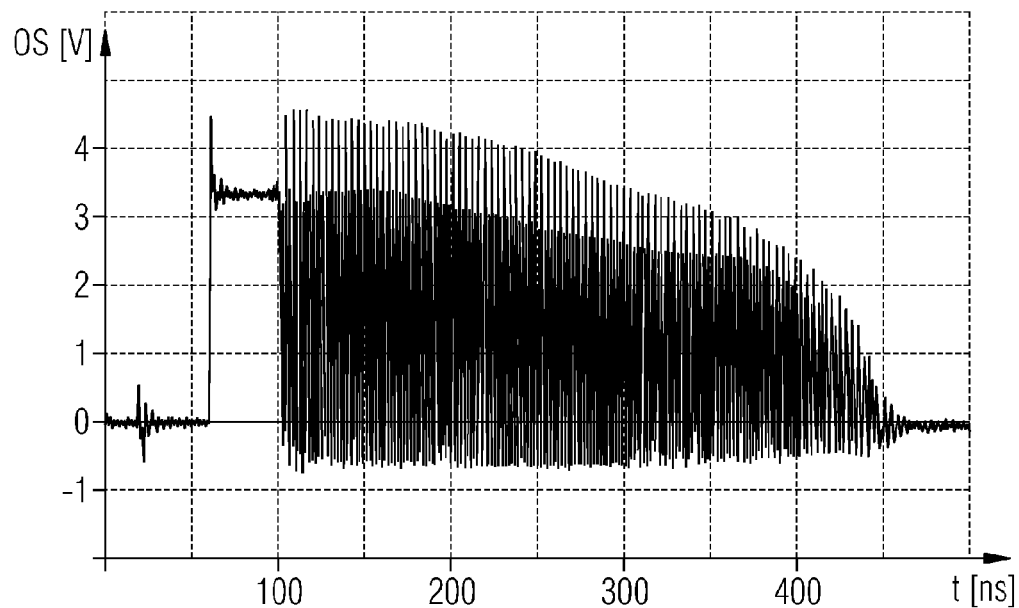
FIGS. 8, 9: show possible forms of oscillator signals.

Shown in FIG. 8 is an exemplary signal form of the oscillator signal OS at the input of flip-flop 14 for random-bit generator 101. It can be seen that after approximately 450 ns the ring oscillator has a stable L level at the output of driver 40 or, as the case may be, input 32 of NAND gate 29. That is the stable state for the ring oscillator.

Figure 9:
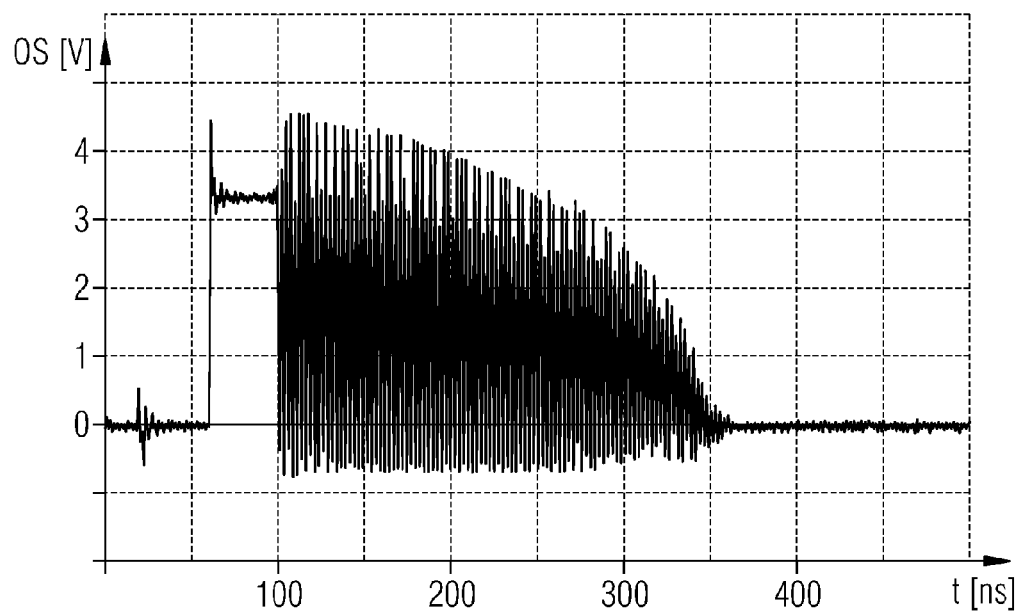

Shown plotted over time in FIG. 9 is a similar signal curve for the oscillator signal after a further start. In the case of the "run" shown in FIG. 9 the two harmonic waves that have been generated coincide or, as the case may be, converge sooner, so that the oscillator's stable state will already have been attained after approximately 370 ns. By counting the resulting signal edges, for example during the predefined period of time between 0 and 450 ns, a random bit ZB will then be derived that can be tapped at output 17 of flip-flop 14.

Figure 10:
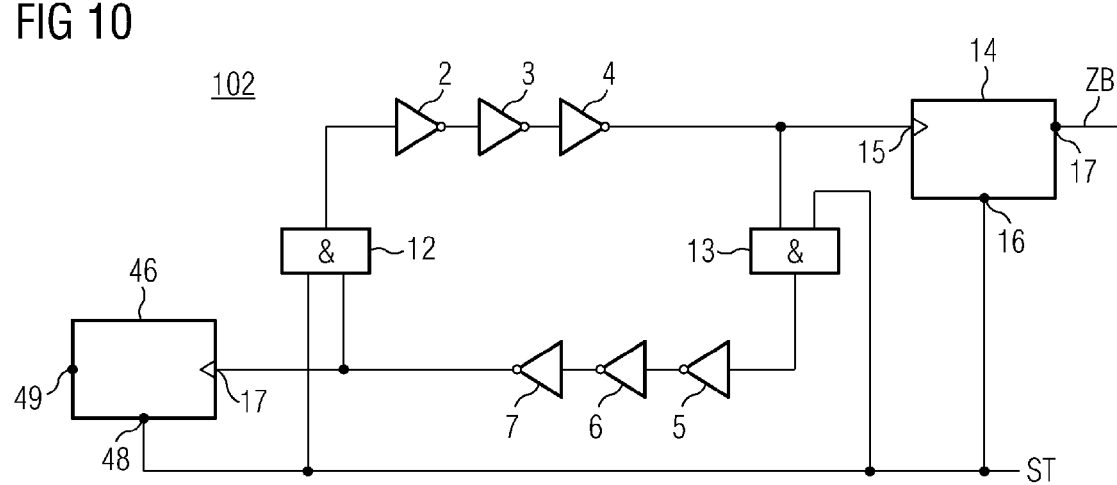
FIG. 10: is a circuit diagram of a third embodiment variant of an apparatus for generating random bit sequences.

Shown further in FIG. 10 is another variant of a random bit generator. Random-bit generator 102 has substantially the same elements as shown in FIG. 1 except that in each case only three inverters 2-4 and 5-7 are connected one behind the other on the upper and lower branch. Elements already explained in FIG. 1 are not dealt with here. Apart from a first buffer element 14 or, as the case may be, a flip-flop, random-bit generator 102 has a second flip-flop 46 preferably identical in structure to first flip-flop 14. Clock input 47 of second flip-flop 46 is coupled to the output of last inverter 7 in the lower inverter chain or, as the case may be, to the input of first AND gate 12. Clock input 15 of first flip-flop 14 is routed to last inverter 4 of the upper inverter chain and to the input of second AND gate 13. Second flip-flop 46 likewise has a resetting input 48 to which the start signal ST is routed as it is also to resetting input 16 of first flip-flop 14.

Second flip-flop 46 therein serves to render the circuit's oscillator part symmetric. Data output 49 is not used. Owing to the symmetric situation that is achieved, a generated harmonic wave will be sustained for a particularly long period of time through first or second AND gate 12, 13. There will consequently be a greater number of signal edges that can potentially be registered by flip-flop 14 and which result in the random bit value ZB.

The random-bit generators presented here in particular offer the advantage that only a small number of digital electronic components will be needed that can be easily implemented in the integrated circuits. The proposed approach can furthermore be simply described in a customary hardware-description language such as VHDL. Logical standard components from cell libraries for IC applications can consequently easily be used. The corresponding components can as a result also be synthetized and used as FPGA applications. No analog circuit components or corresponding fabrication processes are required in the production of corresponding integrated circuits because the random-number generators operate fully digitally.

Because the harmonic waves pass through the same digital components of the respective ring oscillator one after the other, any changes due to the ambient conditions or the electronic components' electric properties will affect the signal edges in the same way. The oscillation processes will hence be particularly robust toward external influences in terms of manufacturing dispersions and ageing processes. An application particularly within mass production, for example on RFIDs, will therefore be apt.

Although the present invention has been explained with the aid of some exemplary embodiments it is not limited thereto but is open to multifarious modifications. Numbers of inverters different from the numbers presented can in particular be provided in the oscillators. It is possible also to generate more than two harmonic wave edges by means of suitable controllable switches in a ring oscillator's signal path. The result is further randomizing of the oscillator signal during the settling process. It is further possible to generate a plurality of harmonic waves of different orders and to use a multiplicity of harmonic-wave edges as randomized elements. Besides the flip-flops presented here and employed as buffer elements, other forms of digital memory can also be used.

What is claimed is:

1. An apparatus for generating a random bit sequence comprising
   a ring oscillator with a plurality of inverting digital devices and on which an oscillator signal can be tapped,
   a buffer element for storing levels of the oscillator signal, and
   at least two controllable switching devices provided in a signal path of the ring oscillator for simultaneously exciting at least two harmonic wave edges of the ring oscillator, the at least two harmonic wave edges forming the oscillator signal.

2. The apparatus according to claim 1, wherein the ring oscillator including as inverting digital devices an even number of serially connected inverters.

3. The apparatus according to claim 1, wherein the controllable switching devices being embodied as logical gates.

4. The apparatus according to claim 1, further comprising the buffer element registering and storing a number of at least one of rising and falling oscillator-signal edges.

5. The apparatus according to claim 4, further comprising a control device tapping a logical level of a random bit at an output of the buffer element, generating the start signal for generating a plurality of random bits, and feeding out the plurality of random bits as a random bit sequence.

6. The apparatus according to claim 1, further comprising a control device generating a start signal for the controllable switching devices and buffer element in such a way that every controllable switching device will in each case generate a harmonic wave edge of the oscillator signal and the buffer element will be reset.

7. The apparatus according to claim 1, wherein in each case an equal number of inverting digital devices being provided between the controllable switching devices.

8. The apparatus according to claim 1, wherein the controllable switching devices in a first switching state blocking oscillating of the ring oscillator and in a second switching state opening a signal path that includes the inverting digital devices.

9. The apparatus according to claim 1, wherein the inverting digital devices and controllable switching devices being integrated as at least two cyclically connected logical gates.

10. The apparatus according to claim 9, wherein a delay device being connected between an input of a logical gate and an output of the respectively other logical gate.

11. The apparatus according to claim 1, further comprising a second buffer element coupled to the ring oscillator in such a way that parasitic influences of the buffer elements will be symmetric with respect to the inverting digital devices.

12. The apparatus according to claim 1, wherein the buffer element being embodied as a flip-flop.

13. The apparatus according to claim 1, wherein the apparatus being embodied as an FPGA.

14. The apparatus according to claim 1, wherein the controllable switching devices being embodied as AND gates or OR gates.

15. A method for generating a random bit sequence comprising the steps:
   providing a ring oscillator that includes digital switch elements;
   exciting at least two harmonic wave edges of the ring oscillator, which harmonic wave edges form an oscillator signal that fluctuates between two predefined logical levels;

tapping the oscillator signal; and determining a random bits as a function of a number of level crossings of the oscillator signal within a predefined period of time.

16. The method according to claim 15, wherein the predefined period of time being selected such that the harmonic wave edges will converge within the predefined period of time and cause the ring oscillator to oscillate in a stable manner.

17. The method according to claim 15, wherein the random bit being determined by counting at least one of rising and falling oscillator-signal edges within the predefined period of time.

18. The method according to claim 17, wherein a number of signal edges undergoing a modulo operation.

19. The method according to claim 15, wherein a plurality of random bits that supply a random bit sequence or binary random number being successively determined.

20. An apparatus for generating a random bit sequence comprising a ring oscillator with a plurality of inverting digital devices and on which an oscillator signal can be tapped, wherein the inverting digital devices comprise an even number of serially connected inverters, a buffer element for storing levels of the oscillator signal, wherein the buffer element registering and storing a number of at least one of rising and falling oscillator-signal edges, at least two controllable switching devices provided in a signal path of the ring oscillator for simultaneously exciting at least two harmonic wave edges of the ring oscillator, the at least two harmonic wave edges forming the oscillator signal, and a control device generating a start signal for the controllable switching devices and buffer element in such a way that every controllable switching device will in each case generate a harmonic wave edge of the oscillator signal and the buffer element will be reset.

* * * * *